United States Patent Office 2,889,261
Patented June 2, 1959

2,889,261

PROCESS FOR IMPROVING PROPERTIES OF ASPHALTS

Armin C. Pitchford, Bartlesville, Okla., assignor to Phillips Petroleum Company, a corporation of Delaware No Drawing. Application May 11, 1956
Serial No. 584,170

13 Claims. (Cl. 208—28)

This invention relates to the production of asphalt. In one of its aspects, the invention relates to the removal of wax causing an unacceptable Oliensis test asphalt by filtering the crude oil from which the asphalt is to be obtained.

In the purchasing of asphalts, tests such as penetration, ductility and Oliensis are ordinarily specified as properties of the asphalt desired. A positive Oliensis test is supposed to indicate the presence of deeply cracked residues in asphalts, but in some instances a positive Oliensis test is obtained from testing asphalts containing no cracked components. It has been found that such misleading Oliensis tests are obtained from asphalts containing excessive amounts of certain types of waxes, which are present in certain crude oils.

It has further been found that these certain types of paraffin waxes can be eliminated from the asphalt product by filtering the said crude oils before the asphalt is produced.

It is an object of this invention to produce an asphalt. It is a further object of this invention to produce an asphalt having an acceptable or negative Oliensis test from uncracked crude oils which normally produce an asphalt having a positive Oliensis test.

Other aspects, objects and advantages of the invention are apparent from a consideration of this disclosure and the appended claims.

According to this invention, there is provided a process for the production of acceptable Oliensis asphalts from crude oils which ordinarily result in asphalts having a positive Oliensis, which comprises filtering the crude oils before the asphalt is produced therefrom.

Thus, according to the invention, the production of acceptable Oliensis asphalt has been made possible by filtering the crude oil; preferably during the filtration step a filter aid is employed since it appears that the filter should be capable of removing wax particles which can be as small as 5 to 10 microns. Indeed, it has been found necessary to use the finer grades of filter aids in order to remove the size particles which are responsible for the positive spot in the Oliensis test. Ordinarily, the said particles will have a size of less than 10 microns.

The operation of filtering is well known, and can be effected in a great number of types of apparatus well known to those skilled in the art. The filter aid can be utilized mixed directly with the crude oil being filtered, but is preferably utilized with a precoat filter. The precoating technique requires less filter aid to filter a given amount of crude and also permits longer runs.

The crude oil can be filtered without the removal of any of the low boiling hydrocarbons present in the oil as received, but the process can also be carried out using a crude which has been stabilized by removing the butane and/or pentane and heavier components.

Following the filtration, the asphalt can be produced from the treated crude by distillation and flashing or by light hydrocarbon precipitation, for example, propane deasphalting. Satisfactory Oliensis test asphalt is produced by either means.

Examples of crudes which can suitably be processed by this invention are Rangely, Bowes-Dome, and East Poplar.

The temperature during the filtration will depend upon the nature of the crude oil and product to be obtained and will generally be maintained between 40° F. and 90° F., preferably between 60° F. and 75° F.

EXAMPLE

Filtrations were made on a Sparkler pressure filter containing seven plates having a total effective area of 2.27 square feet. Cooling water was circulated through the jacket to maintain a constant temperature throughout the operation. The pressure was manually controlled by recycling the crude through the gear pump as necessary to maintain a constant pressure.

The Rangely crude was used in these experiments and was a sample of pipe line crude. Upon filtration, the crude was topped and flashed by the Service Pilot Plant.

Filter aids consisted of the following grade of Celite manufactured by Johns-Manville:

(1) Analytical grade
(2) Hyflo Super-Cel
(3) Celite 503
(4) Celite 545

The analytical grade of filter aid used is believed to correspond to the fine grades of commercial filter aids. Filter Cel is quite a fine grade of commercial filter aid and well suited for use in this process. Hyflo Super-Cel corresponds to a medium grade and Celite 503 and 545 are coarse grade filter aids.

Table I
THE EFFECT OF CRUDE FILTRATION IN THE PRESENCE OF CELITE FILTER AIDS ON THE SOLUBILITIES AND SPOT TESTS OF WOODS CROSS VACUUM ASPHALTS

|  | Control | | 1 | | 2 | |
|---|---|---|---|---|---|---|
| Filtration Data: | | | | | | |
| Grade of Celite | | | Analytical | | 545 | |
| Pounds per Barrel | | | 4.2 | | 1.0 | |
| Temperature, °F | | | 85 | | 85 | |
| Flash Data: | | | | | | |
| Test No | A | B | A | B | A | B |
| Yield, Wt. Percent of Crude | 10.8 | 11.4 | 10.6 | 11.2 | 11.3 | 9.5 |
| Inspection Data: | | | | | | |
| Penetration, 100/5/77° F | 63 | 78 | 70 | 77 | 132 | 30 |
| Solubility, CCl$_4$, 77° F | 98.53 | 98.47 | 99.76 | 99.67 | 98.75 | 98.68 |
| Oliensis Test: | | | | | | |
| 35-65 Xylene-Heptane— | | | | | | |
| 30 Minutes: | | | | | | |
| Paper | Neg. | Neg. | Neg. | Neg. | Neg. | Neg. |
| Glass | S. Pos. | S. Pos. | Neg. | Neg. | Neg. | Neg. |
| 24 Hours: | | | | | | |
| Paper | S. Pos. | S. Pos. | Neg. | Neg. | Pos. | Pos. |
| Glass | Pos. | Pos. | Neg. | Neg. | Neg. | Neg. |
| Standard Naphtha— | | | | | | |
| 30 Minutes: | | | | | | |
| Paper | Neg. | Neg. | Neg. | Neg. | Neg. | Neg. |
| Glass | Neg. | Neg. | Neg. | Neg. | Neg. | Neg. |
| 24 Hours: | | | | | | |
| Paper | S. Pos. | Pos. | Neg. | Neg. | Pos. | Pos. |
| Glass | Pos. | Pos. | Neg. | Neg. | Neg. | Neg. |

(S. Pos. = Slightly positive).

It is seen from the above results that even the coarse grade filter aids produced an improved asphalt, and the fine grade completely eliminated any difficulty with a positive Oliensis test.

An additional desirable effect obtained in the filtration of the crudes, as here described, is that of desalting. The salt removal obtained in the filtration is shown in the following table.

Table II
EFFECTS OF FILTRATION ON THE SALT CONTENT OF RANGELY PIPE LINE CRUDE

| | Filter Aid | Salt Content, Lb./1,000 Bbl. | Percent Reduction |
|---|---|---|---|
| Rangely Crude, Sample W-15-54 | Non-filtered | 36.0 | |
| Rangely Crude, Run F-3 | Celite 545 | 14.5 | 59.7 |
| Rangely Crude, Run F-4 | Celite 545 | 20.9 | 41.9 |
| Rangely Crude, Run F-5 | Hyflo Super-Cel | 11.3 | 68.6 |
| Rangely Crude, Run F-6 | Celite 503 | 13.8 | 61.1 |

Reasonable variation and modification are possible within the scope of the foregoing disclosure and claims to the invention, the essence of which is that acceptable Oliensis asphalts are produced by filtering the crudes which ordinarily do not yield such asphalts before the asphalts are produced therefrom, as described.

It is to be noted by one skilled in the art in possession of this disclosure that the wax which is filtered from the oil according to this invention is a wax which hitherto has not been removed from the oil by ordinary filtration methods.

I claim:
1. A process for the production of negative Oliensis asphalt from a crude oil normally not yielding such a product because it contains wax particles of the order of micron sizes which comprises filtering said crude oil at an ambient temperature to remove said wax particles therefrom which are of the order of micron measured sizes and then producing the asphalt from said crude oil.
2. A process according to claim 1 wherein the crude oil is filtered at a temperature between 40° F. and 90° F.
3. A process according to claim 1 wherein the crude oil is filtered with the aid of a filter aid.
4. A process according to claim 1 wherein the crude oil is an oil selected from Rangely, Bowes-Dome, and East Poplar crude oils.
5. A process according to claim 1 wherein the temperature during filtration is maintained between 60° F. and 75° F.
6. A process according to claim 1 wherein a precoat filter is employed and wherein approximately 0.1 to 5 pounds of filter aid is added per barrel of crude oil.
7. A process for the production of negative Oliensis asphalt from a crude oil normally not yielding such a product which comprises filtering said crude oil to remove wax particles therefrom which are about 10 microns and smaller in size and then producing the asphalt from said crude oil.
8. A process for the production of negative Oliensis asphalt from a crude oil normally not yielding such a product which comprises filtering said crude oil to remove wax particles therefrom which are of the order of micron measured sizes and then producing the asphalt from said crude oil by subjecting the filtered crude oil to a distillation.
9. A process for producing a negative Oliensis asphalt from a crude oil, normally not yielding such an asphalt because the crude oil as produced contains very fine wax particles of the order of micron sizes, which comprises filtering said crude after it is produced, and before it is otherwise treated, to remove wax therefrom, to remove said very fine wax particles therefrom and then producing the asphalt from said crude oil by distillation.
10. A process according to claim 9 wherein the crude oil is filtered at a temperature in the approximate range 40–90° F.
11. A process according to claim 1 wherein the crude oil is admixed with a filter aid before the filtering step.
12. A process according to claim 1 wherein the crude oil is filtered as it comes from the pipeline from the producing field.
13. A process according to claim 1 wherein the crude oil is stabilized to remove therefrom components which are in a gasoline boiling range and then directly filtered.

References Cited in the file of this patent
UNITED STATES PATENTS

| 1,277,935 | Hussey | Sept. 3, 1918 |
| 1,278,023 | Rosenbaum | Sept. 3, 1918 |
| 1,509,325 | Weir et al. | Sept. 23, 1924 |
| 1,559,981 | Petty | Nov. 3, 1925 |
| 1,559,982 | Petty | Nov. 3, 1925 |
| 1,933,868 | Mitchell-Roberts | Nov. 7, 1933 |
| 2,453,094 | Killingsworth et al. | Nov. 2, 1948 |